United States Patent [19]

LeBoueuf

[11] 4,050,709

[45] Sept. 27, 1977

[54] TRAILER DEFLECTOR RAMP

[76] Inventor: Eugene A. LeBoeuf, 9740 Mallery Drive, Noblesville, Ind. 46060

[21] Appl. No.: 650,355

[22] Filed: Jan. 19, 1976

[51] Int. Cl.² .............................................. B60P 1/02
[52] U.S. Cl. .................................. 280/106 T; 214/512
[58] Field of Search .................... 280/106 T; 214/512, 214/621; 254/2

[56] References Cited

U.S. PATENT DOCUMENTS 2,810,602  10/1957  Abrams ........................... 280/106 T 3,737,061  6/1973  Glumac ................................. 214/512

*Primary Examiner*—Philip Goodman
*Attorney, Agent, or Firm*—Edward W. Osann, Jr.

[57] ABSTRACT

A lift bed highway trailer adapted to be coupled to a tractor to transport heavy loads through use of pallet frame units that can be quickly picked up and discharged at any point, wherein provision is made in the trailer gooseneck structure for safely dissipating the kinetic energy of the pallet frame unit through resistance of friction and gravity in event of an emergency stop.

6 Claims, 5 Drawing Figures

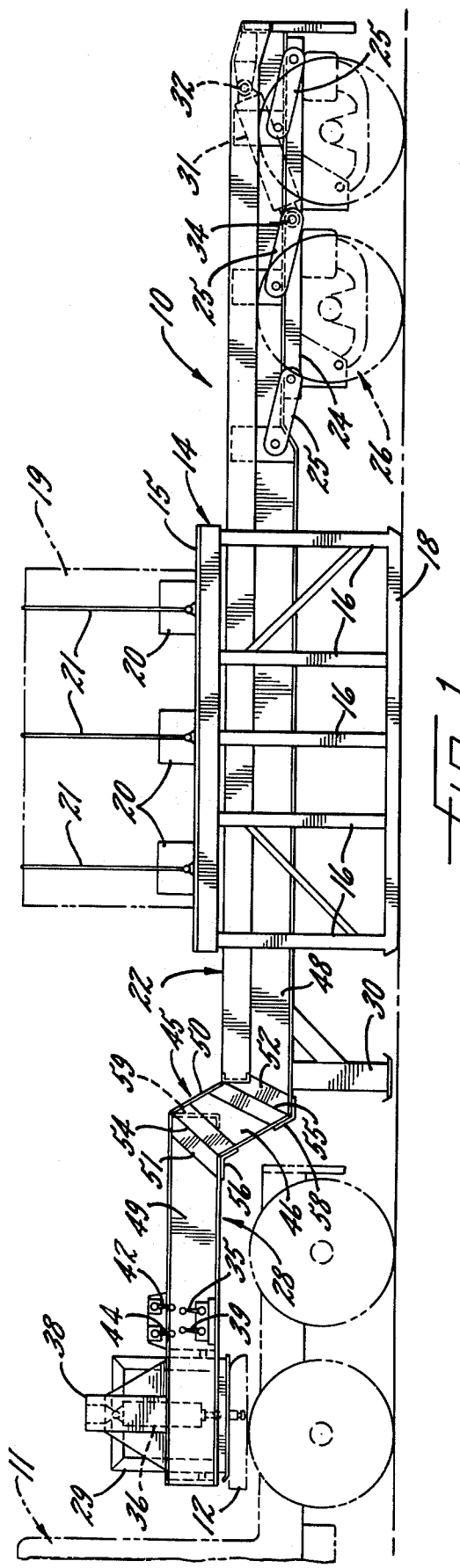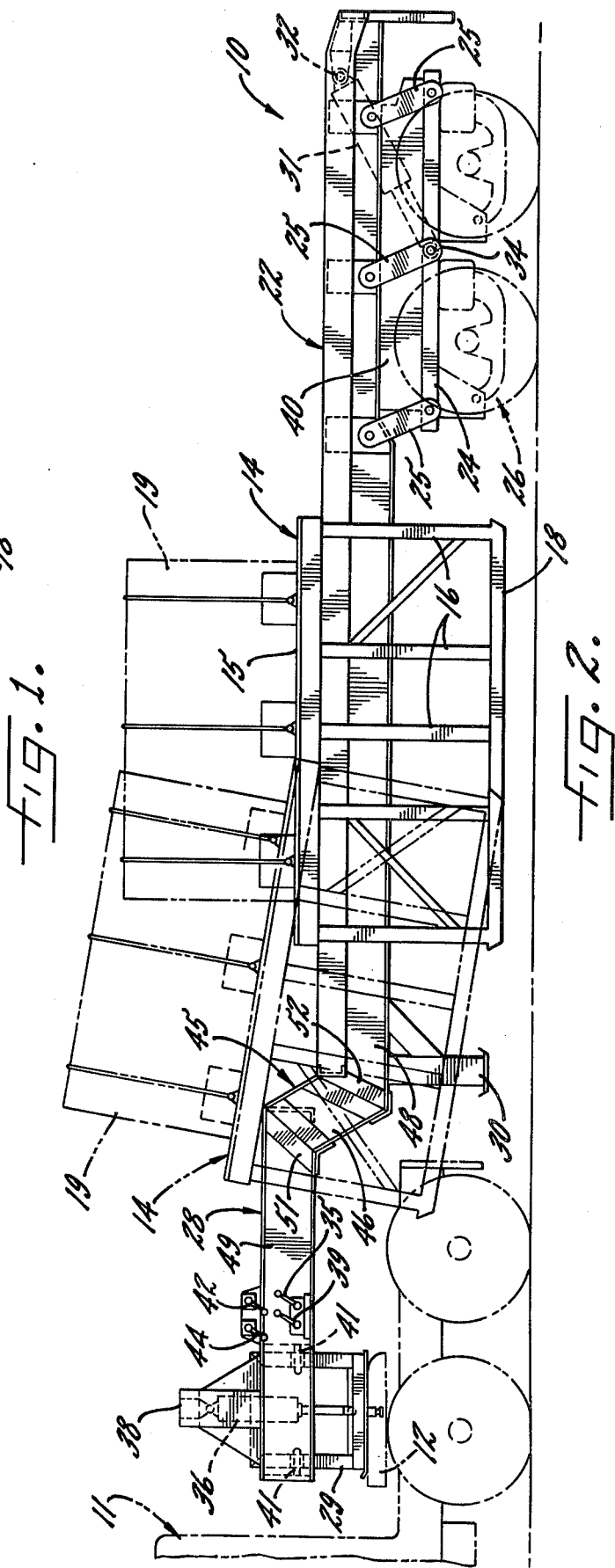

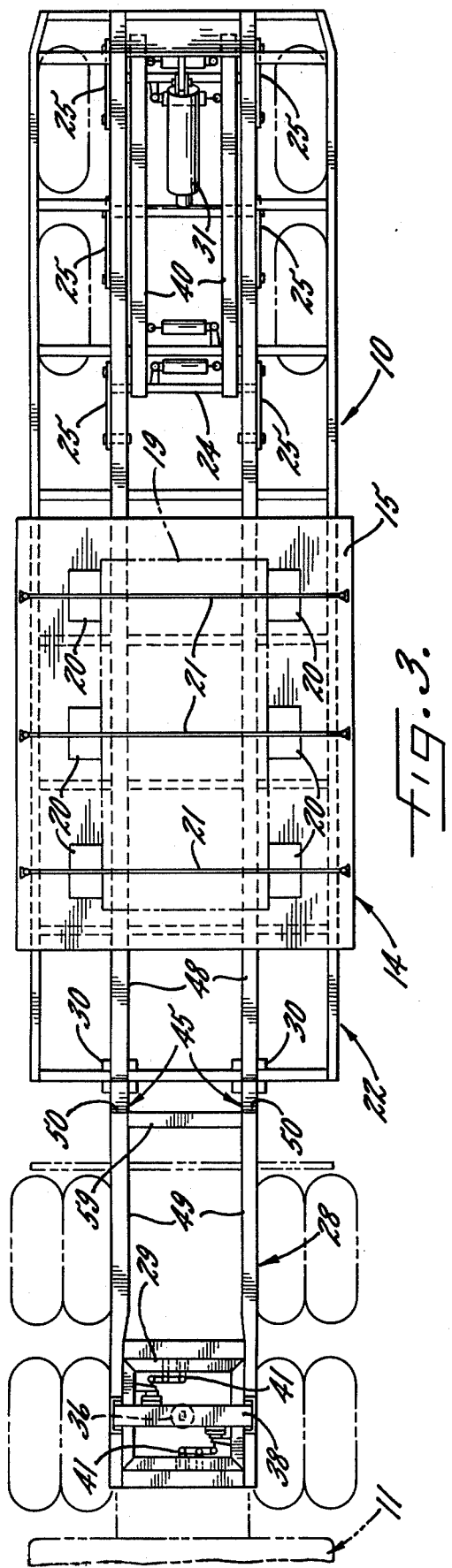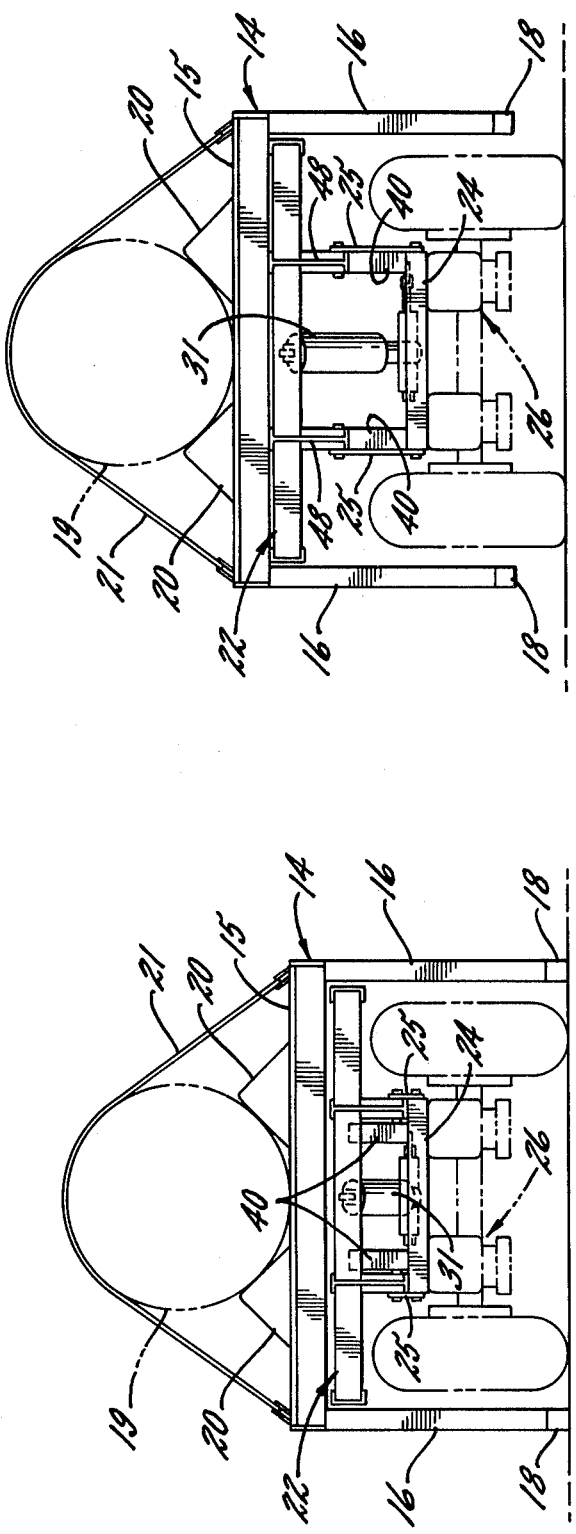

TRAILER DEFLECTOR RAMP

DESCRIPTION OF THE INVENTION

The present invention relates to lift bed highway trailers adapted to be coupled to a tractor by the usual fifth wheel connection. More specifically, the invention relates to trailers of the type adapted to transport heavy loads through the use of pallet frame units that can be quickly picked up and discharged at any desired point.

During the past several years, there has been a trend toward more stringent regulation of all motor vehicles. In the case of tractor-trailer units, this trend has manifested itself in, among other things, regulations providing strict standards for emergency stopping systems and in sophisticated braking equipment for complying with those standards. For a tractor hauling a lift bed trailer and one or more loaded pallet frame units, making an emergency stop with such braking equipment causes a severe problem in maintaining control over the load and preventing damage to the trailer and tractor.

With the foregoing in mind, it is an object of the present invention to provide a lift bed trailer for use with pallet frame units and having provision for safely controlling a loaded pallet frame unit during an emergency stop.

Another object of the invention is to provide a lift bed trailer of the character set forth above wherein control of the pallet frame unit is achieved by taking advantage of the difference in height between the top of the lift bed and the top of the gooseneck.

A further object of the invention is to provide a lift bed trailer of the foregoing type wherein the kinetic energy of the pallet frame unit, in the event of an emergency stop, is dissipated through elevating the forward end of the pallet frame unit against the resistance of friction and gravity.

Other objects and advantages will become apparent as the following description proceeds, taken together with the accompanying drawings, in which:

FIG. 1 is a side elevational view of a lift bed trailer embodying the present invention, the trailer being in lowered position and backed under a loaded pallet frame unit preparatory to picking it up;

FIG. 2 is a view similar to FIG. 1 but showing the lift bed trailer and load in raised or transport position, with a phantom line indication of the forwardly shifted position of the load resulting from an emergency stop;

FIG. 3 is a plan view of the lift bed trailer and load as illustrated in FIG. 1;

FIG. 4 is an end elevational view of the trailer and load as shown in loading position in FIG. 1; and FIG. 5 is an end elevational view of the trailer and load as shown in transport position in FIG. 2.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

Referring more specifically to FIG. 1, the invention is there exemplified in an illustrative lift bed trailer 10 arranged to be coupled to a tractor 11 by means of a conventional fifth wheel connection 12. The trailer 10 is adapted to transport heavy loads through the use of one or more pallet frame units 14 that can be quickly picked up and quickly discharged at any desired point. The pallet frame unit 14 is designed to straddle the bed of the trailer and the latter, when in loading or unloading position, may be moved freely under the unit 14. The use of such pallet frame units permits quick separation of the load from the trailer without waiting for additional equipment or personnel, thereby maximizing the availability of the trailer for transport rather than storage.

The pallet frame unit 14 in this instance is fashioned as a weldment comprising a load carrying platform 15 supported on two laterally spaced sets of legs 16. Each set has a ground engaging skid 18 fixed to the lower ends of the legs. The skid and legs are made from relatively heavy steel tubing of square or rectangular cross section, while the platform 15 may be formed by transverse I-beams and appropriate steel or wood decking. The two sets of legs 16 are spaced a sufficient distance apart to straddle the trailer bed, with adequate clearance on each side to permit the trailer to be easily backed under the platform 15. The latter may, for example, support a steel coil 19 thereon by means of chocks 20 and tie-down bands 21. The coil 19 may weight up to 50,000 pounds.

The trailer 10 comprises a liftable main frame or bed 22 of generally rectangular configuration and constructed of relatively heavy steel structural members. The main frame 22 is connected at its rearward end to a subframe 24 by a plurality of pivot arams 25. The subframe 24 is ground supported through an underlying wheeled suspension 26. The forward end of the main frame 22 is rigidly fixed to a gooseneck 28 which includes a jackbox 29 adapted to engage the fifth wheel of the tractor 11. The forward end of the main frame 22 also includes a pair of landing legs 30 for supporting it when the trailer is detached from the tractor.

For the purpose of shifting the main frame 22 of the trailer between a lowered loading and unloading position (FIGS. 1 and 4), and a raised transport position (FIGS. 2 and 5), the trailer 10 is provided with a pair of independent hydraulic actuators. These include conventional hydraulic actuator 31 connected between a pivot point 32 on the main frame 22 and a pivot point 34 on the subframe 24. The actuator 31 is operated from the hydraulic system of the tractor by means of control valve 35 on the gooseneck and is adapted to raise and lower the rearward end portion of the main frame 22. The other actuator 36 is interposed between the bottom of the jackbox 29 and a yoke 38 fixed to the upper portion of the gooseneck 28, the jackbox and gooseneck being vertically movable relative to each other. The actuator 36 is operated from the hydraulic system of the tractor by means of control valve 39 also located on the gooseneck and is adapted to raise and lower the forward end portion of the main frame. Rearward and forward locking devices 40, 41 are provided for locking the main frame 22 in raised transport position. These devices may be operated from the compressed air system of the tractor by control valves 42 and 44, respectively, also on the gooseneck.

After the trailer 10 has been loaded as shown in FIGS. 1 and 4, and the liftable main frame 22 raised and locked in transport position as shown in FIGS. 2 and 5, the loaded pallet frame unit 14 rests freely upon the main frame 22 and tends to remain in place under normal running conditions. In event of an emergency stop, however, the loaded unit 14 tends to slide forwardly on the main frame 22 with very substantial momentum. In order to allow safe dissipation of the kinetic energy of the forwardly sliding pallet frame unit 14, provision is made for elevating the forward end of the unit 14 against the resistance of friction and gravity. This safely arrests the forward motion of the unit 14 relative to the trailer before it can inflict damage on the gooseneck or the tractor.

The foregoing is accomplished by constructing an inclined, reinforced deflector ramp 45 between the main frame 22 and the gooseneck 28. In this instance, the ramp 45 is defined by a pair of inclined, reinforced transitional I-beam sections 46 interposed between the fore and aft I-beams 48 of the trailer main frame and the fore and aft I-beams 49 of the gooseneck. The top flanges 50 of the I-beam ramp sections 46 are alined with the top flanges of the I-beams 48, 49 and in this case have an inclination of approximately 60 degress with respect to the horizontal. The ramp sections 46 are reinforced on their outboard sides by gusset plates 51, 52 which respectively overlap the seams 54, 55 between the webs of the sections 46 and the webs of the I-beams 48, 49. Reinforcing plates 56, 58 of angular configuration are also secured in underlying relation to the bottom flanges of the sections 46 and the I-beams 48, 49. In addition, a relatively large channel 59 is secured between the webs of the ramp sections 46 at their upper ends to provide further reinforcement.

Referring again to FIG. 2, and with the construction just described in mind, it will be appreciated that in event of an emergency stop, the loaded pallet frame unit 14 will slide forward on the trailer frame 22 and into contact with the flanges 50 of the ramp 45. The forward end of the unit 14 will be cammed up the flanges 50 against frictional and gravitational resistance which dissipates the kinetic energy of the unit 14 relative to the trailer, leaving the unit 14 in a position such as shown in phantom lines in FIG. 2 without damage to the gooseneck or the tractor.

I claim as may invention:
1. In a lift bed highway trailer adapted for coupling to a tractor by means of a fifth wheel connection, the combination comprising:
   a. a liftable main frame having a lowered loading and unloading position and a raised transport position;
   b. a subframe underlying said main frame;
   c. a wheeled suspension underlying said subframe and adapted to serve as a ground support therefor;
   d. a gooseneck fixed to the forward end of said main frame and adapted to connect same to the tractor;
   e. a loaded pallet frame unit adapted to straddle said liftable main frame when the same is in lowered position and to rest freely upon said main frame when the latter is in raised transport position;
   f. means for moving both the forward end portion and the rearward end portion of said main frame between the lowered loading and unloading position and the raised transport position; and
   g. an inclined deflector ramp interposed between said gooseneck and the forward end of said main frame, said ramp being adapted to deflect the loaded pallet frame unit upwardly against the resistance of friction and gravity in event that the latter slides forwardly relative to the trailer under the impact of an emergency stop.

2. The combination set forth in claim 1 wherein said inclined deflector ramp includes a pair of laterally spaced reinforced I-beam sections.

3. In a lift bed highway trailer adapted for coupling to a tractor by means of a fifth wheel connection, the combination comprising:
   a. a liftable main frame having a lowered loading and unloading position and a raised transport position, said main frame including a pair of laterally spaced I-beams disposed fore and aft of the trailer;
   b. a subframe underlying said main frame;
   c. a wheeled suspension underlying said subframe and adapted to serve as a ground support therefor;
   d. a gooseneck fixed to the forward end of said main frame and adapted to connect same to the towing vehicle, said gooseneck including a pair of laterally spaced I-beams disposed fore and aft of the trailer in alinement with but above the I-beams of said main frame;
   e. a loaded pallet frame unit adapted to straddle said liftable main frame when the same is in lowered position and to rest freely upon said main frame when the latter is in raised transport position;
   f. means for moving both the forward end portion and the rearward end portion of said main frame between the lowered loading and unloading position and the raised transport position;
   g. means for locking said main frame in transport position with a loaded pallet frame unit thereon;
   h. a pair of reinforced transitional I-beam sections interposed between said I-beams of said main frame and of said gooseneck, each said transitional I-beam section having an upper flange inclined to the horizontal and connecting the upper flanges of said main frame and gooseneck I-beams; and
   i. said reinforced transitional I-beam sections defining as inclined deflector ramp adapted to deflect the loaded pallet frame unit upwardly against the resistance of friction and gravity in event that said unit slides forwardly relative to the trailer under the impact of an emergency stop.

4. The combination set forth in claim 3 wherein the upper flange of each said transitional I-beam is inclined to the horizontal at an angle of approximately 60°.

5. In a highway trailer having a liftable main frame and gooseneck adapted to be coupled to a trailer by means of a fifth wheel connection, said main frame and gooseneck being liftable between a lowered loading and unloading position and a raised transport position; the combination comprising:
   a. a loaded pallet frame unit adapted to straddle said liftable main frame and transportable thereon, said pallet frame unit being adapted to rest freely upon said main frame during transport;
   b. a pair of laterally spaced I-beams extending longitudinally of said main frame;
   c. a pair of laterally spaced I-beams extending longitudinally of said gooseneck and above the level of said main frame I-beams;
   d. a pair of inclined transitional I-beams each alined with and connecting one of said main frame I-beams and one of said gooseneck I-beams and having a web abutting the respective webs of the latter and having top and bottom flanges abutting the respective flanges of the latter;
   e. gusset plates overlapping the abutting areas of said I-beam webs;
   f. angular reinforcing plates overlapping the abutting areas of the bottom flanges of said main frame, transitional, and gooseneck I-beams; and g. said transitional I-beams, gusset plates and angular reinforcing plates defining a ramp adapted to deflect the loaded pallet frame unit upwardly against the resistance of friction and gravity as the latter slides forwardly relative to the trailer under the impact of an emergency stop.

6. The combination set forth in claim 5 wherein the webs of said transitional I-beams are connected by a transverse channel member.

* * * * *